United States Patent
Tsurusaki et al.

(10) Patent No.: US 9,151,978 B2
(45) Date of Patent: Oct. 6, 2015

(54) TOUCH PANEL, DISPLAY DEVICE HAVING INPUT FUNCTION, AND ELECTRONIC DEVICE

(75) Inventors: Kouji Tsurusaki, Kirishima (JP); Yuki Nozaki, Yokohama (JP); Natsuko Yamagata, Kirishima (JP); Takashi Minami, Kirishima (JP)

(73) Assignee: Kyocera Corporation, Kyoto (JP)

( * ) Notice: Subject to any disclaimer, the term of this patent is extended or adjusted under 35 U.S.C. 154(b) by 93 days.

(21) Appl. No.: 14/110,854

(22) PCT Filed: Apr. 5, 2012

(86) PCT No.: PCT/JP2012/059353
§ 371 (c)(1),
(2), (4) Date: Oct. 9, 2013

(87) PCT Pub. No.: WO2012/141071
PCT Pub. Date: Oct. 18, 2012

(65) Prior Publication Data
US 2014/0028931 A1 Jan. 30, 2014

(51) Int. Cl.
*G02F 1/1333* (2006.01)
*G06F 3/041* (2006.01)
*G06F 3/044* (2006.01)
*G06F 1/16* (2006.01)

(52) U.S. Cl.
CPC .......... *G02F 1/13338* (2013.01); *G06F 1/1626* (2013.01); *G06F 1/1643* (2013.01); *G06F 1/1656* (2013.01); *G06F 3/041* (2013.01); *G06F 3/044* (2013.01); *G06F 2203/04112* (2013.01)

(58) Field of Classification Search
CPC . G06G 1/1626; G06G 1/1643; G06G 1/1656; G02F 1/13338; G06F 3/041; G06F 3/044
USPC .............................................. 349/12; 345/173
See application file for complete search history.

(56) References Cited

U.S. PATENT DOCUMENTS

| 2010/0220071 A1 | 9/2010 | Nishihara et al. |
| 2010/0245706 A1* | 9/2010 | Oohira ............................ 349/58 |
| 2011/0018826 A1 | 1/2011 | Shoji |
| 2011/0227846 A1* | 9/2011 | Imazeki ........................ 345/173 |

FOREIGN PATENT DOCUMENTS

| JP | 2010218542 A | 9/2010 |
| JP | 2011028476 A | 2/2011 |

OTHER PUBLICATIONS

International Search Report, PCT/JP2012/059353, May 1, 2012, 1 pp.
Japanese International Search Report, PCT/JP2012/059353, May 1, 2012, 2 pp.

* cited by examiner

*Primary Examiner* — James Dudek
(74) *Attorney, Agent, or Firm* — Volpe and Koenig, P.C.

(57) ABSTRACT

A display device having an input function includes: a display panel; a touch panel disposed on a front side of the display panel; and a flexible substrate connected to the touch panel and bent toward a back side of the display panel, wherein the touch panel includes a first light-shielding film and a second light-shielding film at portions facing a part of the flexible substrate.

19 Claims, 5 Drawing Sheets

Y DIRECTION

X DIRECTION

TOUCH PANEL, DISPLAY DEVICE HAVING INPUT FUNCTION, AND ELECTRONIC DEVICE

FIELD OF INVENTION

The present invention relates to a display device having an input function, and an electronic device.

BACKGROUND

In recent years, a display device having an input function provided with a touch panel has been widely used for an electronic device such as a mobile phone, a smart phone, a game terminal, or a copier (for example, see Patent Literature 1). Such a display device having an input function includes, for example, a display panel, a touch panel disposed on a front side of the display panel, and a backlight disposed on a back surface side of the display panel. The touch panel is connected to a flexible substrate, and this flexible substrate is bent toward a back side of the backlight.

In the display device having an input function, for example, light from the backlight is emitted to the touch panel through the display panel. In this case, the flexible substrate connected to the touch panel may be visible to a user through the touch panel.

CITATION LIST

Patent Literature

Patent Literature 1: Japanese Laid-open Patent Publication No. 2010-218542

SUMMARY

The present invention has been made in view of the above problem, and an object of the present invention is to provide a display device having an input function and an electronic device, that can make a flexible substrate connected to a touch panel less visible to a user.

A display device having an input function, comprising: a display panel; a touch panel disposed on a front side of the display panel; and a flexible substrate connected to the touch panel and bent toward a back side of the display panel, wherein the touch panel includes a first light-shielding film and a second light-shielding film at portions facing a part of the flexible substrate.

An electronic device comprising the display device having the input function.

DETAILED DESCRIPTION OF THE PREFERRED EMBODIMENTS

Figure 1:
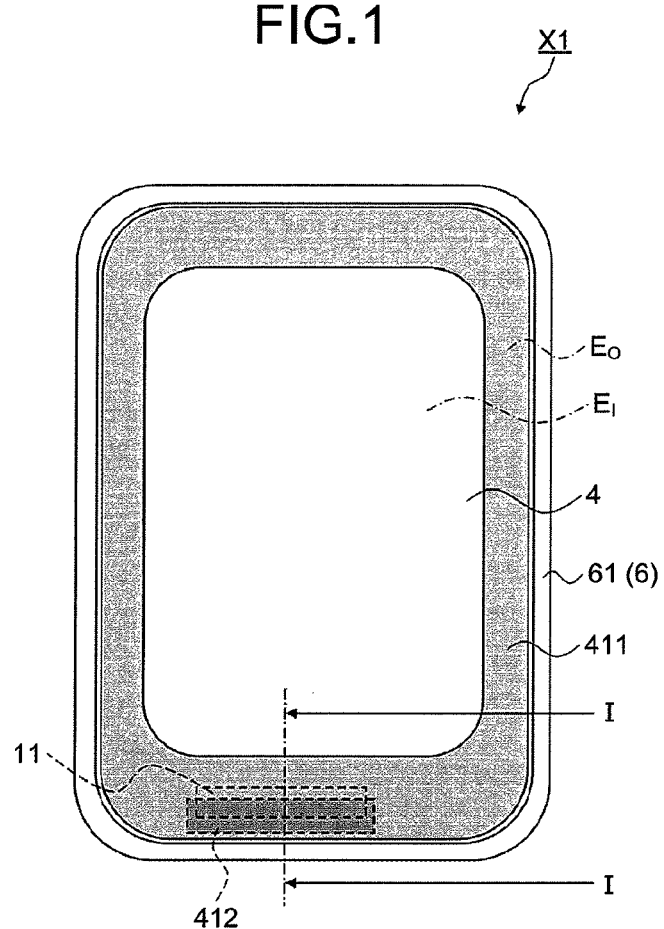
FIG. 1 is a plan view showing a schematic structure of a display device having an input function according to this embodiment.

An embodiment of the present invention is hereinafter described with reference to the drawings.

In each drawing, the main components according to an embodiment of the present invention necessary for the description of the present invention are simplified for the convenience of the description. Therefore, the display device having an input function and the electronic device according to the present invention may have any other component which is not shown in the drawings to which the present specification refers.

Figure 2:
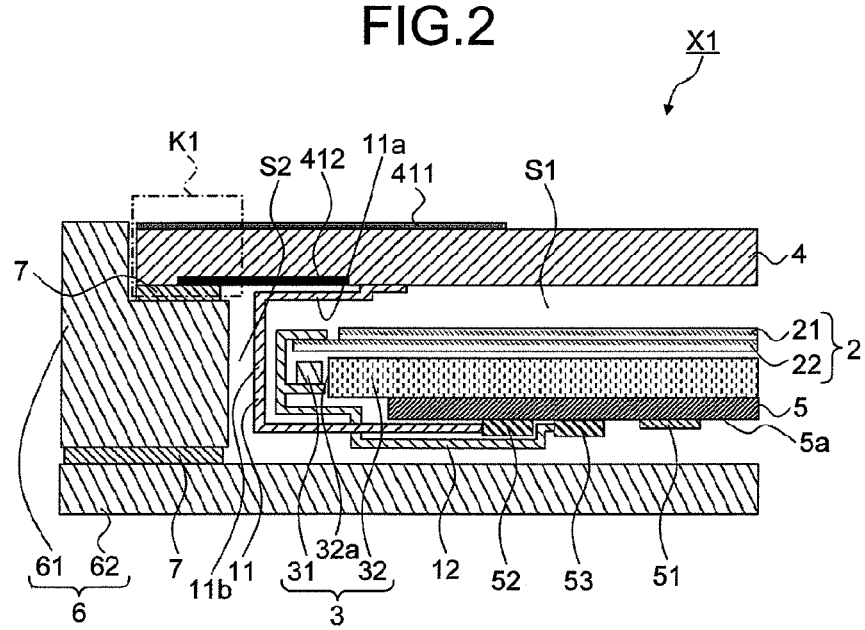
FIG. 2 is a sectional view taken along a cutting line I-I of FIG. 1.

As shown in FIG. 1, a display device X1 having an input function according to this embodiment includes a display input region EI which can display a desired image and to which information can be input, and an external region EO which is positioned outside the display input region EI. In other words, the external region EO according to this embodiment is positioned so as to surround the display input region EI. As shown in FIG. 1 and FIG. 2, the display device X1 having an input function includes a liquid crystal panel 2, a backlight 3, a touch panel 4, a wiring board 5, and a first case 6.

The liquid crystal panel 2 is a display panel utilizing a liquid crystal composition for display. Specifically, the liquid crystal panel 2 includes an upper substrate 21, a lower substrate 22 projected more outward than the upper substrate 21 and disposed facing the upper substrate 21, a liquid crystal layer (not shown) interposed between the upper substrate 21 and the lower substrate 22, and a display member layer (not shown) interposed between the upper substrate 21 and the lower substrate 22 and contributing to display. Note that the display member layer corresponds to, for example, a pixel electrode, an alignment film, a color filter, or the like. The driving method for the liquid crystal panel 2 may be either a simple matrix driving method or an active matrix driving method. The liquid crystal panel 2 may be either a monochromatic display panel or a color display panel. Further, the liquid crystal panel 2 may be either a transmissive type, a semi-transmissive type, or a reflective type.

Instead of the liquid crystal panel 2, a display device such as a plasma panel, an organic EL panel, or electronic paper may be used. Here, the organic EL panel is a display panel utilizing a substance which emits light by applying voltage. Specifically, the organic EL panel is formed by depositing a light-emitting body including an organic substance such as diamines on a substrate, and performs display by application of a direct voltage of 5 to 10 V. In the case of using the organic EL panel instead of the liquid crystal panel 2, the backlight 3 becomes unnecessary. If the liquid crystal panel 2 is a reflective type, the backlight 3 is unnecessary.

The backlight 3 is disposed on a back side of the liquid crystal panel 2, and has a role of irradiating the liquid crystal panel 2. The backlight 3 includes a first light source 31 and a light guide plate 32. The first light source 31 has a role of emitting light toward an end face 32a of the light guide plate 32, and includes, for example, an LED (Light-Emitting Diode). Note that instead of the LED, a cold cathode fluorescent lighting lamp, a halogen lamp, a xenon lamp, or an EL may be used as the first light source 31. The first light source 31 is provided on a second flexible substrate 12, which is described later, so as to face the end face 32a of the light guide plate 32. The light guide plate 32 has a role of guiding light from the first light source 31 approximately uniformly toward the entire bottom surface of the lower substrate 22 of the liquid crystal panel 2.

The touch panel 4 is disposed on a front side of the liquid crystal panel 2, and has a role of detecting a position pointed by a user with a finger or a pen, etc. as an input position. As shown in FIG. 2, the touch panel 4 is disposed to face the liquid crystal panel 2 through a first space S1. Note that the first space S1 is a space existing between the liquid crystal panel 2 and the touch panel 4. The touch panel 4 is projected more outward than the liquid crystal panel 2. Therefore, the approximately entire surface of the touch panel 4 is irradiated with the light from the backlight 3 through the liquid crystal panel 2.

Although the following description is made of the example in which the touch panel 4 is a projection type capacitance touch panel, the present invention is not limited thereto. Alternatively, the touch panel 4 may be a surface type capacitance touch panel. Further alternatively, the touch panel 4 may be a resistance film type touch panel, a surface acoustic wave type touch panel, an infrared ray type touch panel, or an electromagnetic induction type touch panel.

Figure 3:
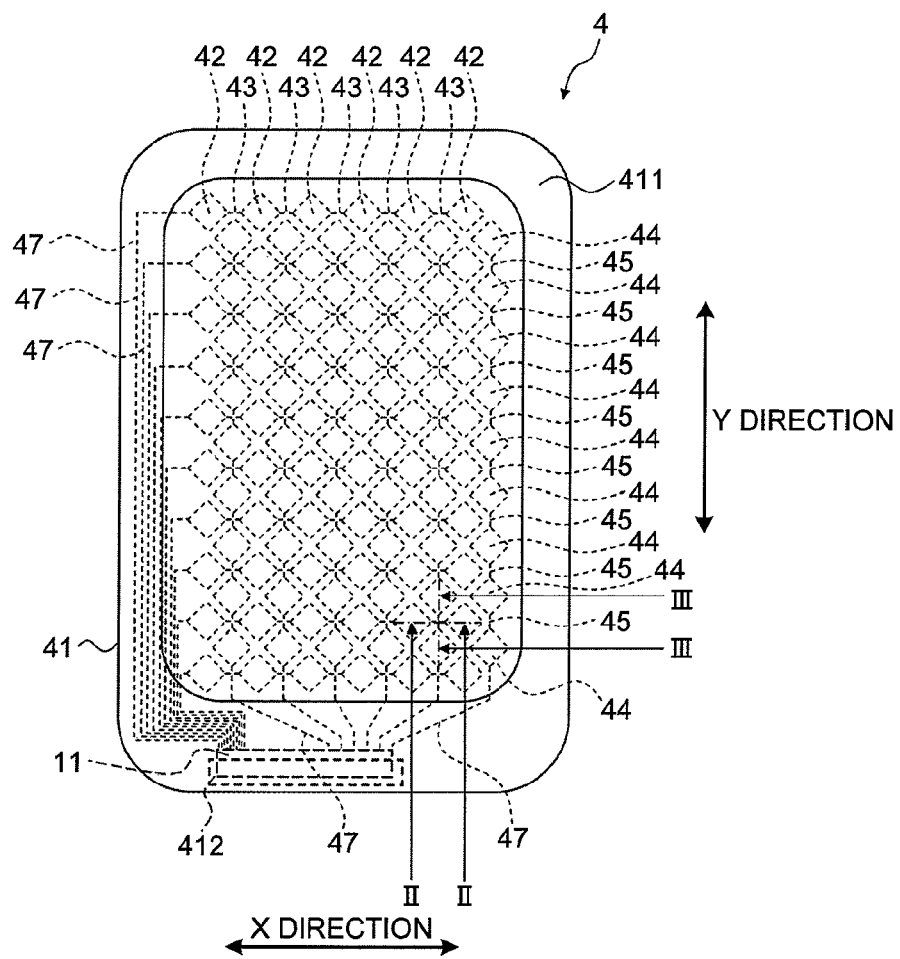
FIG. 3 is a plan view showing a schematic structure of a touch panel.
Figure 4:
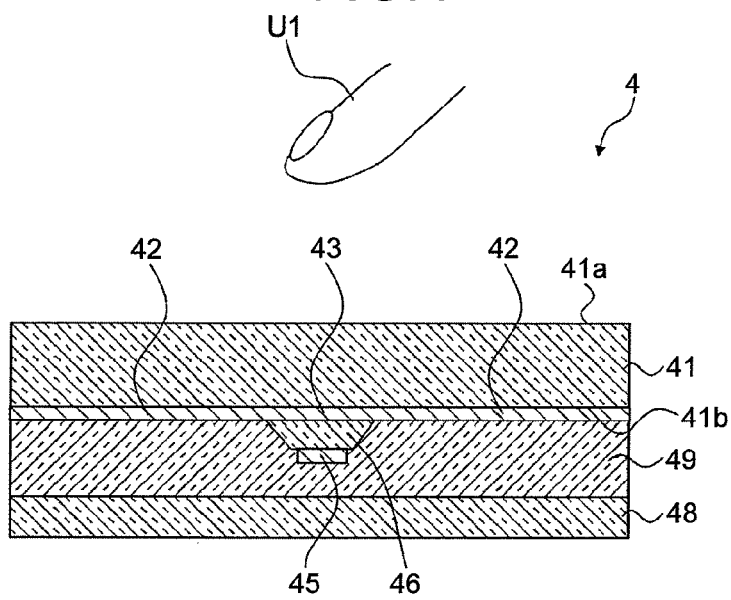
FIG. 4 is a sectional view taken along a cutting line II-II of FIG. 3.
Figure 5:
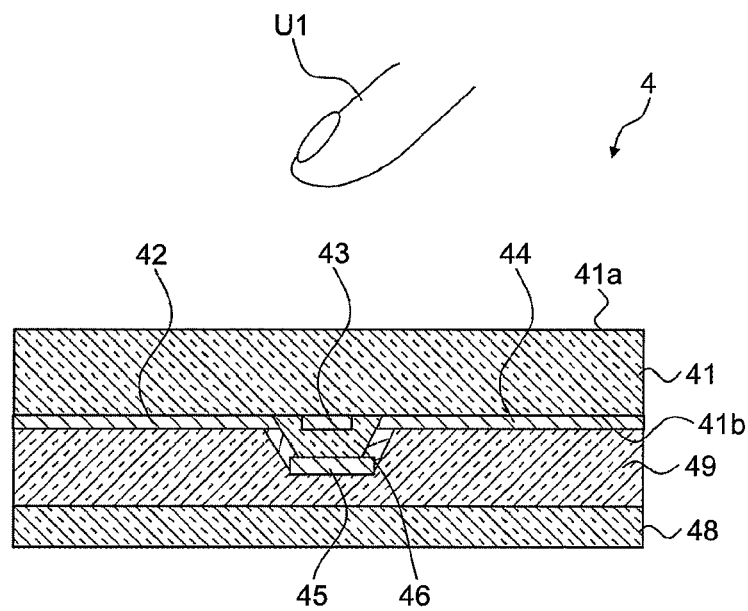
FIG. 5 is a sectional view taken along a cutting line III-III of FIG. 3.

FIG. 3 is a plan view showing a schematic structure of the touch panel 4 according to this embodiment. FIG. 4 is a sectional view taken along a cutting line II-II of FIG. 3. FIG. 5 is a sectional view taken along a cutting line III-III of FIG. 3.

As shown in FIG. 3 to FIG. 5, the touch panel 4 includes a base 41. The base 41 includes an operation surface 41a on which a user operates with a finger, a pen, or the like, and a back surface 41b positioned on the opposite side of the operation surface 41a. For protecting the operation surface 41a, a protection film may be provided on the operation surface 41a. The base 41 may be structured to be able to transmit light as appropriate in a direction intersecting with the operation surface 41a and the back surface 41b and moreover to have an insulation property. The material of the base 41 may be, for example, a material with a light-transmitting property such as glass or plastic; above all, glass is preferable from the viewpoint of the visibility. In this specification, the light-transmitting property refers to a transmitting property relative to visible light.

On the back surface 41b of the base 41 corresponding to the display input region EI, a first detection electrode 42, a first connection electrode 43, a second detection electrode 44, a second connection electrode 45, and an insulator 46 are provided.

The first detection electrode 42 has a role of detecting an input position of a finger U1 of a user approximate to the display input region EI in the Y direction, and has a function of generating electrostatic capacitance between the electrode and the finger U1. In other words, the first detection electrode 42 is provided with a predetermined space over the back surface 41b of the base 41 in the X direction. Here, the first detection electrode 42 according to this embodiment has an approximately rhombus shape from the viewpoint of improving the detection sensitivity; however, the present invention is not limited thereto.

The first connection electrode 43 is a member having a role of electrically connecting the adjacent first detection electrodes 42 to each other. The first connection electrode 43 is provided on the back surface 41b of the base 41.

The second detection electrode 44 has a role of detecting an input position of the finger U1 of a user approximate to the display input region EI in the X direction, and has a function of generating electrostatic capacitance between the electrode and the finger U1. In other words, the second detection electrode 44 is provided with a predetermined space over the back surface 41b of the base 41 in the Y direction. Here, the second detection electrode 44 according to this embodiment has an approximately rhombus shape from the viewpoint of improving the detection sensitivity; however, the present invention is not limited thereto.

The second connection electrode 45 is a member having a role of electrically connecting the adjacent second detection electrodes 44 to each other. The second connection electrode 45 is provided over the insulator 46 so as to be electrically insulated from the first connection electrode 43 and to straddle the insulator 46. Here, the insulator 46 is provided on the back surface 41b of the base 41 so as to cover the first connection electrode 43. The material of the insulator 46 may be, for example, a transparent resin such as an acrylic resin, an epoxy resin, or a silicone resin.

The materials for the first detection electrode 42, the first connection electrode 43, the second detection electrode 44, and the second connection electrode 45 may be, for example, a conductive member having a light-transmitting property. The conductive member having a light-transmitting property corresponds to, for example, ITO (indium tin oxide), IZO (indium zinc oxide), ATO (antimony tin oxide), AZO (Al-doped zinc oxide), tin oxide, zinc oxide, or a conductive polymer (such as PEDOT or PSS).

On the back surface 41b of the base 41 corresponding to the external region EO, a detection wire 47 is provided.

The detection wire 47 has a role of applying voltage to the first detection electrode 42 and the second detection electrode 44, and a role of detecting the change in electrostatic capacitance generated between the finger U1 and the first detection electrode 42 and the second detection electrode 44. An end of the detection wire 47 is electrically connected to the first detection electrode 42 and the second detection electrode 44, while the other end thereof is electrically connected to a first flexible substrate 11 as later described. The detection wire 47 is formed of, for example, a metal thin film in order to have high hardness and high shape stability. This metal thin film corresponds to, for example, an aluminum film, an aluminum alloy film, a multilayer film of a chromium film and an aluminum film, a multilayer film of a chromium film and an aluminum alloy film, a silver film, a silver alloy film, or a gold alloy film. As a method for forming the aforementioned metal thin film, for example, a sputtering method, a deposition method, or a chemical vapor deposition method is given.

A protection member 48 has a role of protecting the first detection electrode 42, the first connection electrode 43, the second detection electrode 44, the second connection electrode 45, the insulator 46, the detection wire 47, and a second light-shielding film 412 as later described. Therefore, the protection member 48 is provided so as to cover these members. In other words, the protection member 48 adheres to the back surface 41b of the base 41 with a bonding member 49 interposed therebetween. For the protection member 48, for example, a polyethylene terephthalate film, an acrylic film, a polycarbonate film, a resin film, or the like can be used. As the bonding member 49, for example, an acrylic based adhesive, a silicone based adhesive, a rubber based adhesive, a urethane based adhesive, or the like is given.

Figure 6:
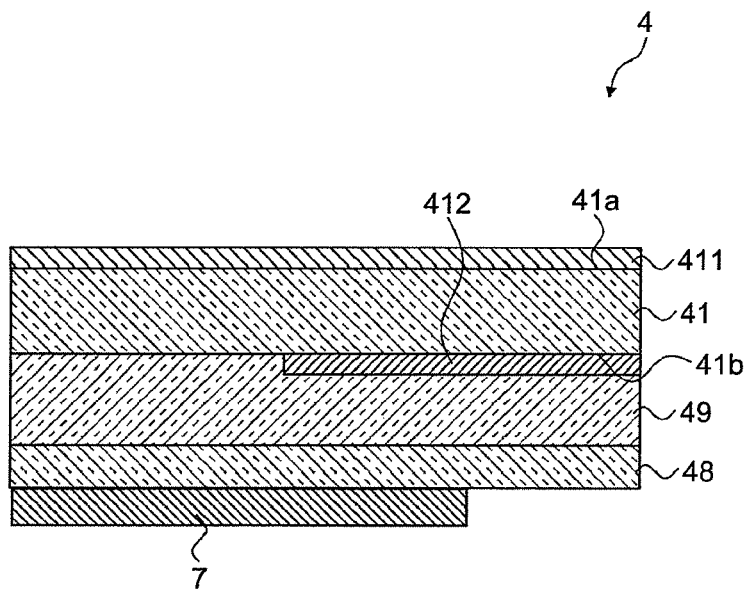
FIG. 6 is a magnified view of a part K1 shown in FIG. 2.

FIG. 6 is a magnified view of a part K1 of FIG. 2. As shown in FIG. 1 to FIG. 3 and FIG. 6, a first light-shielding film 411 is provided on the operation surface 41a of the base 41 corresponding to the external region EO. For the convenience of the description, in FIG. 3, the light-shielding film 411 is not colored as shown in FIG. 1 and FIG. 2. In FIG. 3, for the convenience of the description, the second light-shielding film 412 as later described is not colored as shown in FIG. 1 and FIG. 2.

The first light-shielding film 411 has a role of shielding light entering in a direction intersecting with the operation surface 41a and the back surface 41b of the base 41. In this specification, "light-shielding" refers to shielding of a part of or all of the visible light by reflection or absorption. In a plan view, the first light-shielding film 411 is provided for the outer periphery (external region EO) of the base 41 so as to cover the detection wire 47. Since the first light-shielding film 411 is provided at the outer periphery of the base 41 so as to cover the detection wire 47, the entire external region EO can be decorated and the detection wire 47 can be made less visible to the user.

As the material of the first light-shielding film 411, a material including a colorant in a resin is given. As the resin, for example, an acrylic based resin, an epoxy based resin, or silicon dioxide is given. The colorant may be, for example, carbon, titanium, or chromium. Note that the first light-shielding film 411 may have other color than black. The first light-shielding film 411 may be formed by, for example, a screen printing method, a sputtering method, a CVD (chemical vapor deposition) method, or a deposition method.

On the back surface 41b of the base 41 corresponding to the external region EO, the second light-shielding film 412 is provided. Like the first light-shielding film 411, the second light-shielding film 412 has a role of shielding light entering in a direction intersecting with the operation surface 41a and the back surface 41b of the base 41. In this embodiment, the first light-shielding film 411 is provided for the outer periphery of the base 41; meanwhile, the second light-shielding film 412 is provided for a part of the outer periphery of the base 41 (a part of the lower side of the outer periphery of the base 41 in the example shown in FIG. 1). The material of the second light-shielding film 412 may be similar to that of the first light-shielding film 411.

Note that the second light-shielding film 412 may have a plurality of projections and depressions on a surface. By forming the plurality of projections and depressions on the surface of the second light-shielding film 412, the adhesion area between the bonding member 49 and the second light-shielding film 412 increases. When the adhesion area between the bonding member 49 and the second light-shielding film 412 increases, the adhesion strength between the bonding member 49 and the second light-shielding film 412 increases. Therefore, the adhesion strength between the protection member 48 and the second light-shielding film 412 increases. Accordingly, the separation of the protection member 48 and the bonding member 49 from the second light-shielding film 412 can be suppressed.

The wiring board 5 is a plate-like or a film-like board disposed on the back side of the backlight 3, and has a control circuit, a resistor, a capacitor, and the like mounted on a mount surface 5a. By connecting these components with wires, electronic circuits are formed. As control circuits 51 mounted on the mount surface 5a of the wiring board 5, for example, a touch panel driver for controlling the touch panel 4, a backlight driver for controlling the backlight 3, a display driver for controlling the liquid crystal panel 2, and the like are given. The display driver may be provided on the lower substrate 22, which protrudes outward as compared with the upper substrate 21 in the liquid crystal panel 2, by COG (Chip On Glass). The display driver may alternatively be provided on the second flexible substrate 12 by COF (Chip On Film).

The first case 6 has a role of housing the liquid crystal panel 2, the backlight 3, and the wiring board 5. As the material for the first case 6, for example, resin such as polycarbonate, or metal such as stainless steel or aluminum is given.

The first case 6 includes an upper case 61 and a lower case 62. The upper case 61 is attached to the touch panel 4 corresponding to the outer region EO through an adhesive member 7, and the lower case 62 is attached to the upper case 61 through the adhesive member 7. As the adhesive member 7, a double-sided tape, an acrylic based adhesive, a silicone based adhesive, a rubber based adhesive, a urethane based adhesive, or the like is given. With the touch panel 4, the upper case 61, and the lower case 62, the liquid crystal panel 2, the backlight 3, and the wiring board 5 are sealed. Thus, external dust or water can less easily adhere to the liquid crystal panel 2, the backlight 3, and the wiring board 5.

Although the above example has described the separate upper case 61 and lower case 62 as the first case 6, the present invention is not limited thereto. For example, the upper case 61 and the lower case 62 may be integrally formed.

Although the above example has described the first case 6 houses the wiring board 5 together with the liquid crystal panel 2 and the backlight 3, the present invention is not limited thereto. The wiring board 5 may be provided outside the first case 6.

Here, the mount surface 5a of the wiring board 5 is provided with a first connector 52 and a second connector 53. The first connector 52 and the second connector 53 are electrically connected to the control circuit 51.

The first connector 52 is connected to the first flexible substrate 11. In other words, the first flexible substrate 11 is connected to the first connector 52 in a manner that the first flexible substrate 11 is electrically connected to the detection wire 47 of the touch panel 4 and the first flexible substrate 11 is bent toward the back side of the liquid crystal panel 2, specifically, toward the back side of the wiring board 5 through a second space S2. Note that the second space S2 is a space existing between the liquid crystal panel 2 and the backlight 3, and the upper case 61. Thus, the detection wire 47 of the touch panel 4 is electrically connected to the control circuit 51 via the first flexible substrate 11 and the first connector 52.

The second connector 53 is connected to the second flexible substrate 12. In other words, the second flexible substrate 12 is connected to the second connector 53 in a manner that the second flexible substrate 12 is electrically connected to the liquid crystal panel 2 and the first light source 31 of the backlight 3 and the second flexible substrate 12 is bent toward the back side of the liquid crystal panel 2, specifically, toward the back side of the wiring board 5 through the second space S2. Thus, the liquid crystal panel 2 and the first light source 31 of the backlight 3 are electrically connected to the control circuit 51 via the second flexible substrate 12 and the second connector 53.

As shown in FIG. 2, the upper case 61 and the first flexible substrate 11 preferably have a gap therebetween. This is because the contact between the upper case 61 and the first flexible substrate 11 may cause the upper case 61 to destroy the first flexible substrate 11. Due to the similar reason, the upper case 61 and the second flexible substrate 12 preferably have a gap therebetween.

Although the above example has described that the above connection state is achieved by the use of the two flexible substrates 11 and 12, the present invention is not limited thereto. The above connection state may be achieved by using one flexible substrate or using three or more flexible substrates.

As shown in FIG. 2, the touch panel 4 includes the first light-shielding film 411 and the second light-shielding film 412 at portions facing a part of the first flexible substrate 11. That is, the touch panel 4 includes not just the first light-shielding film 411 but also the second light-shielding film 412 at the portions facing a part of the first flexible substrate 11; therefore, the first flexible substrate 11 can be made less visible to the user. Specific description is made below.

As aforementioned, the touch panel 4 is projected more outward than the liquid crystal panel 2 and is disposed to face the liquid crystal panel 2 with the first space S1 interposed therebetween. Therefore, the approximately entire surface of the touch panel 4 is irradiated with the light from the backlight 3 through the liquid crystal panel 2. For this reason, the first flexible substrate 11 positioned in the first space S1 may be saw by a user through the touch panel 4 because of the light from the backlight 3 through the liquid crystal panel 2. Note that in FIG. 2, a first portion of the flexible substrate 11 positioned in the first space S1 is denoted by a reference symbol "11a".

In contrast, in this embodiment, the touch panel 4 includes the first light-shielding film 411 and the second light-shielding film 412 at portions facing the first portion 11a of the first flexible substrate 11 positioned in the first space S1. That is, the touch panel 4 includes not just the first light-shielding film 411 but also the second light-shielding film 412 at the portions facing the first portion 11a of the first flexible substrate 11. Accordingly, it is possible to suppress that the first portion 11a of the first flexible substrate 11 is saw by the user through the touch panel 4 because of the light from the backlight 3 through the liquid crystal panel 2.

Figure 7:
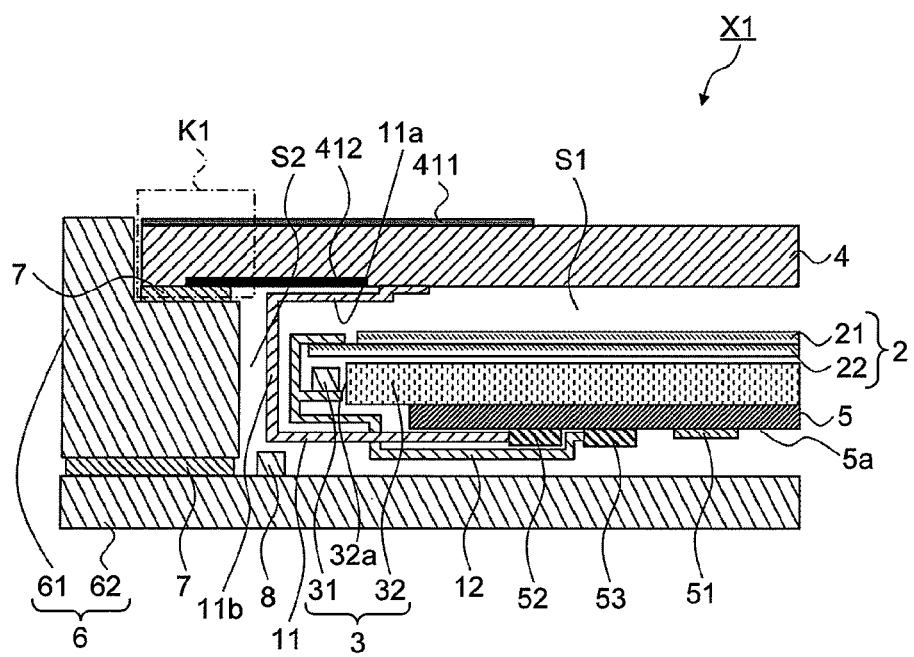
FIG. 7 is a sectional view taken along a cutting line I-I of FIG. 1, showing an embodiment in which a second light source is provided on a top surface of a lower case.

When the display device X1 having the input function is provided for a mobile terminal such as a smart phone, the external region EO of the display device X1 having the input function is displayed by illumination, for example. In this case, a second light source 8 is provided on a top surface of the lower case 62 corresponding to the second space S2 as shown in FIG. 7. In other words, by making the second light source 8 emit light, the external region EO of the touch panel 4 can be displayed by illumination through the second space S2. Note that the second light source 8 is formed by, for example, an LED.

In the display device X1 having the input function shown in FIG. 7, the external region EO of the touch panel 4 is irradiated with the light from the second light source 8 through the second space S2. Therefore, there is a possibility that the first flexible substrate 11 positioned in the second space S2 is saw by the user through the touch panel 4 because of the light from the second light source 8 through the second space S2. In FIG. 2 and FIG. 7, a second portion of the first flexible substrate 11 that is positioned in the second space S2 is denoted by a reference symbol "11b".

In contrast to this, in this embodiment, the touch panel 4 includes the first light-shielding film 411 and the second light-shielding film 412 at the portions that face the second portion 11b of the first flexible substrate 11 positioned in the second space S1. In other words, the touch panel 4 includes not just the first light-shielding film 411 but also the second light-shielding film 412 at the portions that face the second portion 11b of the first flexible substrate 11. Therefore, it is possible to suppress that the second portion 11b of the first flexible substrate 11 is saw by the user through the touch panel 4 because of the light from the second light source 8 through the second space S2.

There is a possibility that the light leaked from the liquid crystal panel 2 is reflected on the top surface of the lower case 62 and the touch panel 4 is irradiated with this reflected light through the second space S2. Therefore, the display device X1 having the input function shown in FIG. 2 also provides the effect similar to that of the display device X1 having the input function shown in FIG. 7 when having the first light-shielding film 411 and the second light-shielding film 412 at the portions that face the second portion 11b of the first flexible substrate 11.

In this embodiment, as shown in FIG. 2, the first light-shielding film 411 and the second light-shielding film 412 are provided on the base 41 so as to cover the second space S2; therefore, it is possible to make both the first flexible substrate 11 and the second flexible substrate 12 less visible to the user through the touch panel 4.

Further, it can be effectively suppressed that when the first light-shielding film 411 has higher transmittance than the second light-shielding film 412, the first flexible substrate 11 is saw by the user. For example, this case corresponds to the case in which the first light-shielding film 411 is formed to be white and the second light-shielding film 412 is formed to be black. Since the first light-shielding film 411 is formed to be white, the use of just the first light-shielding film 411 may cause the first flexible substrate 11 to be visible to the user; however, since the second light-shielding film 412, which is formed to be black, is provided, the second light-shielding film 412 makes the first flexible substrate 11 less visible to the user.

Note that the transmittance of the first light-shielding film 411 and the second light-shielding film 412 can be measured by using a known spectrophotometer.

Figure 8:
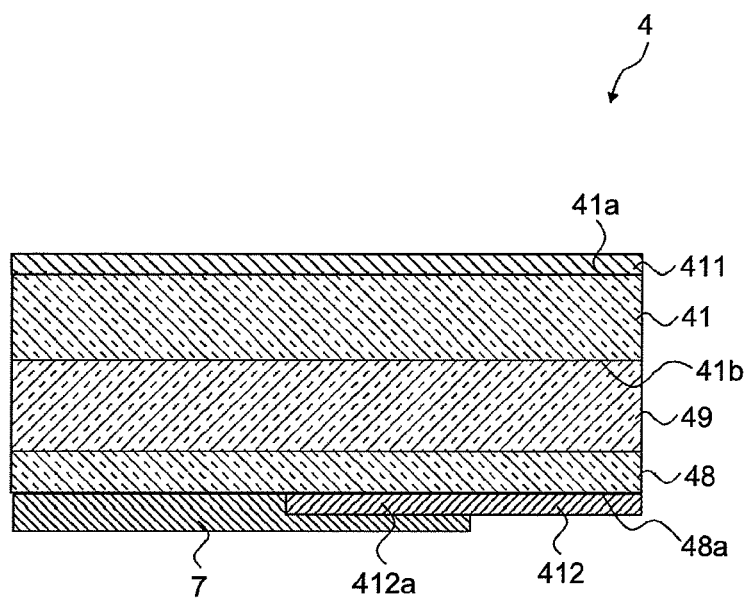
FIG. 8 is a magnified view of the part K1 shown in FIG. 2, showing an embodiment different from that of FIG. 6.

Although the above example has described that the second light-shielding film 412 is provided on the back surface 41b of the base 41 corresponding to the external region EO, the present invention is not limited thereto. For example, the second light-shielding film 412 may be provided for a bottom surface 48a of the protection member 48 as shown in FIG. 8. In this case, in order to suppress the separation of the second light-shielding film 412 from the bottom surface 48a of the protection member 48, a part 412a of the second light-shielding film 412 is preferably embedded in the adhesive member 7. Moreover, in order to further suppress the separation of the second light-shielding film 412 from the bottom surface 48a of the protection member 48, the part 412a of the second light-shielding film 412 may have a plurality of projections and depressions on a surface thereof. This is because the formation of the projections and depressions increases the adhesion area between the adhesive member 7 and the part 412a of the second light-shielding film 412 and increases the adhesion strength between the adhesive member 7 and the part 412a of the second light-shielding film 412.

Next, the principle of the detection of the touch panel 4 is described.

The control circuit 51 supplies voltage to the first detection electrode 42 and the second detection electrode 44 through the first connector 52, the first flexible substrate 11, and the detection wire 47. When the finger U1 as a conductor gets closer to the operation surface 41a of the base 41 corresponding to the display input region EI, the electrostatic capacitance is generated between the finger U1 and the first detection electrode 42 and the second detection electrode 44. The control circuit S1 normally detects the electrostatic capacitance generated at the first detection electrode 42 and the second detection electrode 44, and detects the input position at which the user performs the input operation, on the basis of the combination of the first detection electrode 42 and the second detection electrode 44 which have detected a predetermined value or more of the electrostatic capacitance. Thus, the touch panel 4 can detect the input position.

The touch panel 4 allows the user to input various kinds of information through the input operation on the display input region EI while seeing the liquid crystal panel 2. Note that the touch panel 4 may have a function of giving various senses such as the sense of pressure, the sense of tracing, or the sense of texture to the user having input the information. This can be achieved when the base 41 of the touch panel 4 has one or more vibrators (for example, a piezoelectric element) which vibrate at a predetermined frequency upon the detection of a predetermined input operation or predetermined pressure load.

Thus, in the display device X1 having the input function, the first flexible substrate 11 connected to the touch panel 4 can be made less visible to the user.

Next, a mobile terminal P1 including the display device X1 having the input function is described with reference to FIG. 9.

Figure 9:
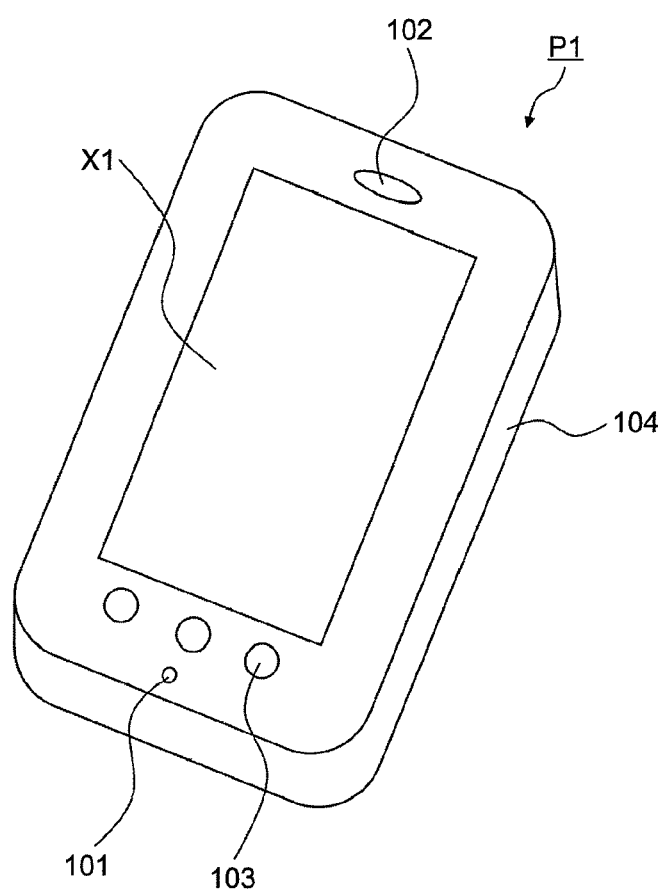
FIG. 9 is a perspective view showing a schematic structure of a mobile terminal according to this embodiment.

FIG. 9 is a perspective view showing the schematic structure of the mobile terminal P1 according to this embodiment. As shown in FIG. 9, the mobile terminal P1 is, for example, an electronic device such as a mobile phone, a smart phone, or a PDA (Personal Digital Assistant), and includes the display device X1 having the input function, a voice input unit 101, a voice output unit 102, a key input unit 103, and a second case 104.

The voice input unit 101 includes, for example, a microphone or the like, to which a voice and the like of a user are input. The voice output unit 102 includes, for example, a speaker or the like, from which a voice and the like of a counterpart are output. The key input unit 103 includes, for example, a mechanical key. Note that the key input unit 103 may be an operation key displayed on a display screen. The second case 104 plays a role of housing the display device X1 having the input function, the voice input unit 101, the voice output unit 102, and the key input unit 103.

In addition to these, the mobile terminal P1 may include a digital camera function unit, a one-segment mobile broadcasting tuner, a near field communication unit such as an infrared communication function unit, or other various interfaces; their details and illustrations are omitted.

Since the mobile terminal P1 includes the display device X1 having the input function, the first flexible substrate 11 connected to the touch panel 4 can be made less visible to the user.

Although the above example has described that the mobile terminal P1 includes the voice input unit 101, the present invention is not limited thereto. In other words, the mobile terminal P1 does not need to have the voice input unit 101.

Although the above example has described that the mobile terminal P1 includes the second case 104 for housing the display device X1 having the input function, the present invention is not limited thereto. Instead of providing the second case 104 separately, the first case 6 of the display device X1 having the input function may serve as the case of the mobile terminal P1.

Further, instead of the mobile terminal P1, the display device X1 having the input function may be used for a display tool intended for the industrial application, a display tool intended for the application in vehicles, or various electronic devices such as an electronic notebook, a personal computer, a copier, a game terminal device, a TV set, and a digital camera.

REFERENCE SIGNS LIST

X1 DISPLAY DEVICE HAVING AN INPUT FUNCTION
P1 ELECTRONIC DEVICE
2 LIQUID CRYSTAL PANEL (DISPLAY PANEL)
4 TOUCH PANEL
41 BASE
42 FIRST DETECTION ELECTRODE (DETECTION ELECTRODE)
44 SECOND DETECTION ELECTRODE (DETECTION ELECTRODE)
47 DETECTION WIRE
411 FIRST LIGHT-SHIELDING FILM
412 SECOND LIGHT-SHIELDING FILM
6 FIRST CASE (CASE)
11 FIRST FLEXIBLE SUBSTRATE (FLEXIBLE SUBSTRATE)

What is claimed is:

1. A display device having an input function, comprising:
a display panel;
a touch panel disposed on a front side of the display panel; and
a flexible substrate connected to the touch panel and bent toward a back side of the display panel, wherein
the touch panel includes a first light-shielding film and a second light-shielding film at portions facing a part of the flexible substrate, and the part of the flexible substrate, the second light-shielding film, and the first light-shielding film are disposed in this order in a direction from the display panel toward the touch panel in a sectional view.

2. The display device having an input function according to claim 1, wherein:
the display panel and the touch panel are disposed to face each other with a first space interposed therebetween; and
the touch panel includes the first light-shielding film and the second light-shielding film at portions facing the flexible substrate positioned in the first.

3. The display device having an input function according to claim 1, further comprising a case for place therein the display panel, wherein:
the flexible substrate is bent toward the back side of the display panel through a second space between the display panel and the case; and
the touch panel includes the first light-shielding film and the second light-shielding film at portions facing the flexible substrate positioned in the second space.

4. The display device having an input function according to claim 1, wherein:
the touch panel includes a base, a detection electrode provided on the base, and a detection wire provided on the base and electrically connected to the detection electrode; and
the first light-shielding film is provided for an outer periphery of the base so as to cover the detection wire in a plan view.

5. The display device having an input function according to claim 1, wherein the first light-shielding film has higher transmittance than the second light-shielding film.

6. The display device having an input function according to claim 1, wherein the display panel is a liquid crystal panel.

7. An electronic device comprising a display device having an input function, the display device comprising:
a display panel;
a touch panel disposed on a front side of the display panel; and
a flexible substrate connected to the touch panel and bent toward a back side of the display panel, wherein the touch panel includes a first light-shielding film and a second light shielding film at portions facing a part of the flexible substrate, and the part of the flexible substrate, the second light-shielding film, and the first light-shielding film are disposed in this order in a direction from the display panel toward the touch panel in a sectional view.

8. A touch panel to which a flexible substrate is connected;
the touch panel comprising first and second light-shielding films on portions facing a part of the flexible substrate; and,
the part of the flexible substrate, the second light-shielding film, and the first light-shielding film being disposed in this order in a direction from a back side toward a front side of the touch panel in a sectional view.

9. The touch panel according to claim 8, wherein the first light-shielding film is provided on the front side of the touch panel; and
the second light-shielding film is provided on the back side of the touch panel.

10. The touch panel according to claim 8, further comprising:
a base;
a detection electrode disposed on the base;
a detection wire disposed on the base and electrically connected to the detection electrode; wherein,
the first light-shielding film is provided on an outer periphery of the base to cover the detection wire in a plan view.

11. The touch panel according to claim 10, wherein the second light-shielding film is provided on a part of the outer periphery of the base in a plan view.

12. The touch panel according to claim 11, wherein the second light-shielding film totally overlaps with the first light-shielding film in a plan view.

13. The touch panel according to claim 8, wherein the part of the flexible substrate is separated from the first and second light-shielding films.

14. The touch panel according to claim 8, wherein the second light-shielding film has a plurality of projections and depressions on its surface.

15. The touch panel according to claim 8, wherein the first light-shielding film has higher transmittance than that of the second light-shielding film.

16. The display device having an input function according to claim 1, wherein the first light-shielding film is provided on a front side of the touch panel; and,
the second light-shielding film is provided on a back side of the touch panel.

17. The display device having an input function according to claim 1, wherein the part of the flexible substrate is separated from the first and second light-shielding films.

18. The display device having an input function according to claim 1, wherein the second light-shielding film has a plurality of projections and depressions on its surface.

19. The display device having an input function according to claim 1, further comprising:
a backlight disposed on the back side of the display panel; and
a wiring board disposed on a back side of the backlight; wherein
the flexible substrate is bent toward a back side of the wiring board.

* * * * *